US006532265B1

(12) United States Patent
Van der Auwera et al.

(10) Patent No.: US 6,532,265 B1
(45) Date of Patent: Mar. 11, 2003

(54) METHOD AND SYSTEM FOR VIDEO COMPRESSION

(75) Inventors: Geert Van der Auwera, Bonheiden (BE); Adrian Munteanu, Elsense (BE); Gauthier Lafruit, St.-Lambrechts Woluwe (BE); Jan Cornelis, Overijse (BE)

(73) Assignees: IMEC vzw (BE); Vrije Universiteit Brussels (BE)

( * ) Notice: Subject to any disclaimer, the term of this patent is extended or adjusted under 35 U.S.C. 154(b) by 0 days.

(21) Appl. No.: 09/537,469

(22) Filed: Mar. 24, 2000

Related U.S. Application Data

(60) Provisional application No. 60/126,059, filed on Mar. 25, 1999.

(51) Int. Cl.[7] ................................................ H04N 7/18
(52) U.S. Cl. .............................. 375/240.16; 375/240.19
(58) Field of Search ........... 375/240.19, 240.12–240.17

(56) References Cited

U.S. PATENT DOCUMENTS

| | | | | |
|---|---|---|---|---|
| 5,495,292 A | * | 2/1996 | Zhang et al. | 375/240.02 |
| 5,832,234 A | * | 11/1998 | Iverson et al. | 375/240.11 |
| 6,351,491 B1 | * | 2/2002 | Lee et al. | 375/240.03 |

OTHER PUBLICATIONS

Dufaux, et al., "Motion–compensated generic coding of video based on a multiresolution data structure", Optical Engineering, vol. 32, No. 7, Jul. 1993, pp. 1559–1570.

Martucci, et al., "A Zerotree Wavelet Video Coder", IEEE Transactions on Circuits and Systems for Video Technology, vol. 7, No. 1, Feb. 1997, pp. 109–118.

Mandal, et al., "Multiresolution Motion Estimation Techniques for Video Compression",Visual Computing and Communications Laboratory, 1992, pp. 1–26.

Cafforio,et al., "Motion Compensation and Multiresolution Coding", Signal Processing: Image Communication 6, 1994, pp. 123–142.

Zhang, et al., "Motion–Compensated Wavelet Transform Coding for Color Video Compression", IEEE Transactions on Circuits and Systems for Video Technology, vol. 2, No. 3, Sep. 1992, pp. 285–296.

* cited by examiner

*Primary Examiner*—Andy Rao
(74) *Attorney, Agent, or Firm*—Knobbe, Martens, Olson & Bear, LLP

(57) ABSTRACT

A method of determining the motion vector of a block of a video frame with respect to a reference video frame. The video frame and reference video frame comprising pixels, wherein each pixel has a pixel value. The method comprises first determining a plurality of sets of error norms, wherein each error norm within one of the sets is related to a different position of the block in the reference video frame, wherein the error norms are calculated by a norm of an error which is given by functions of the pixel values of the block of the video frame and the reference video frame, and wherein each set of the plurality of sets is related to a different function. Second, the motion vector is selected with the smallest error norm.

29 Claims, 9 Drawing Sheets

FIGURES
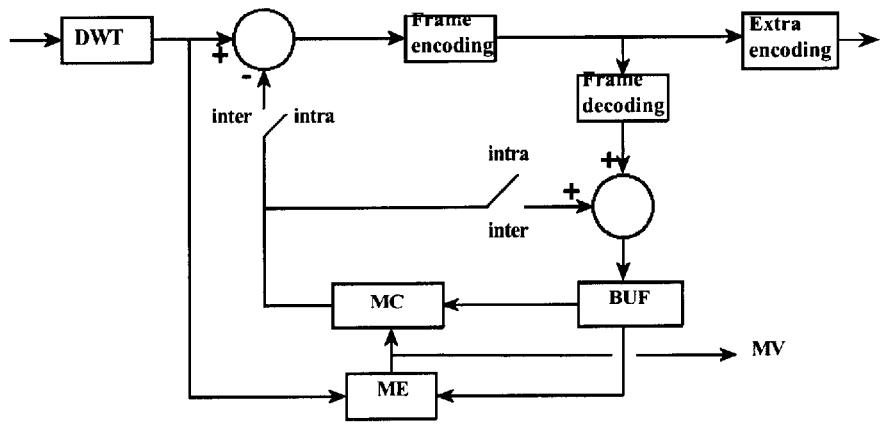
Figure 1. Wavelet-based video encoder with temporal prediction in the wavelet domain.
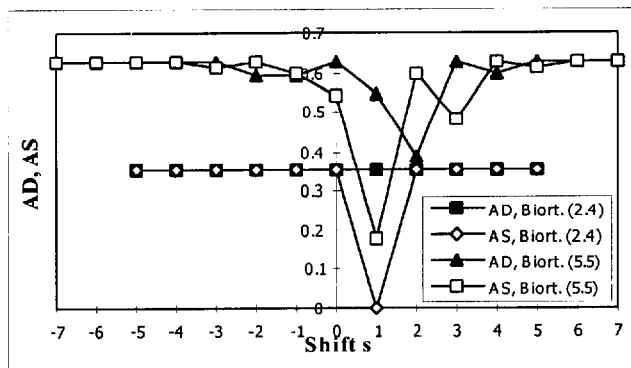
Figure 2. $AD$ and $AS$ as a function of $s$ and $k = 1$, for the biorthogonal filters (2.4) and (5.5).
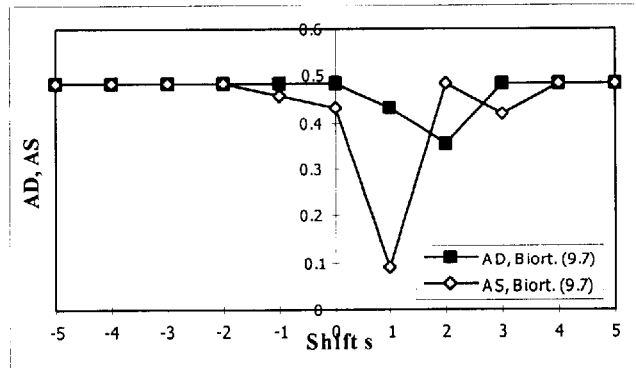
Figure 3. $AD$ and $AS$ as a function of $s$ and $k = 1$, for the biorthogonal filters (9.7).

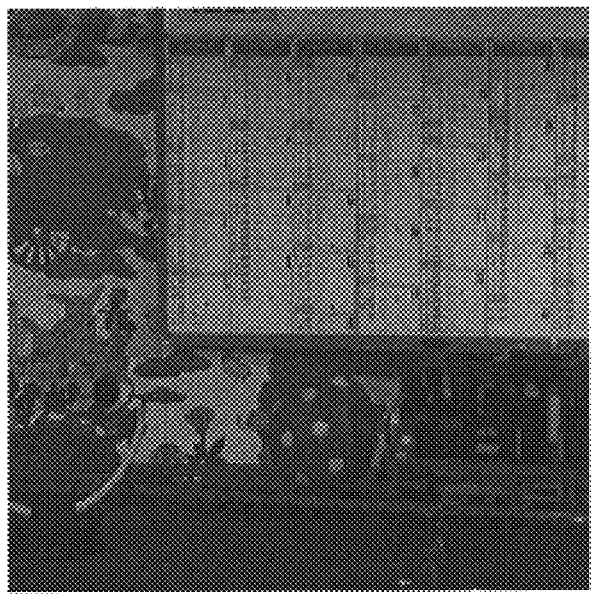
Figure 4. "Mobile & Calendar" sequence, converted to 256×256 format.
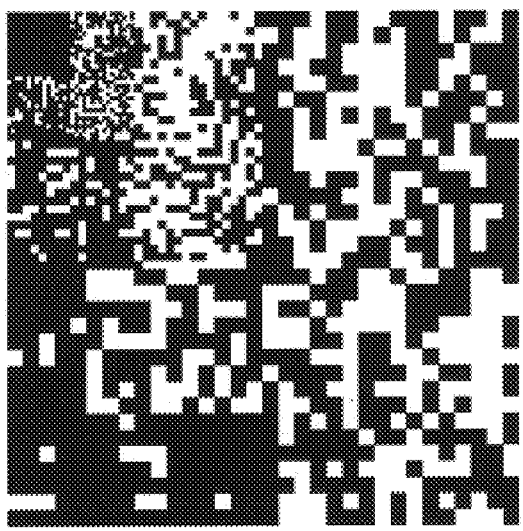
Figure 5. The *FS-AS/AD (2,4,8)* method attains a minimum with the *AS* criterion (white blocks) or *AD* criterion (black blocks).

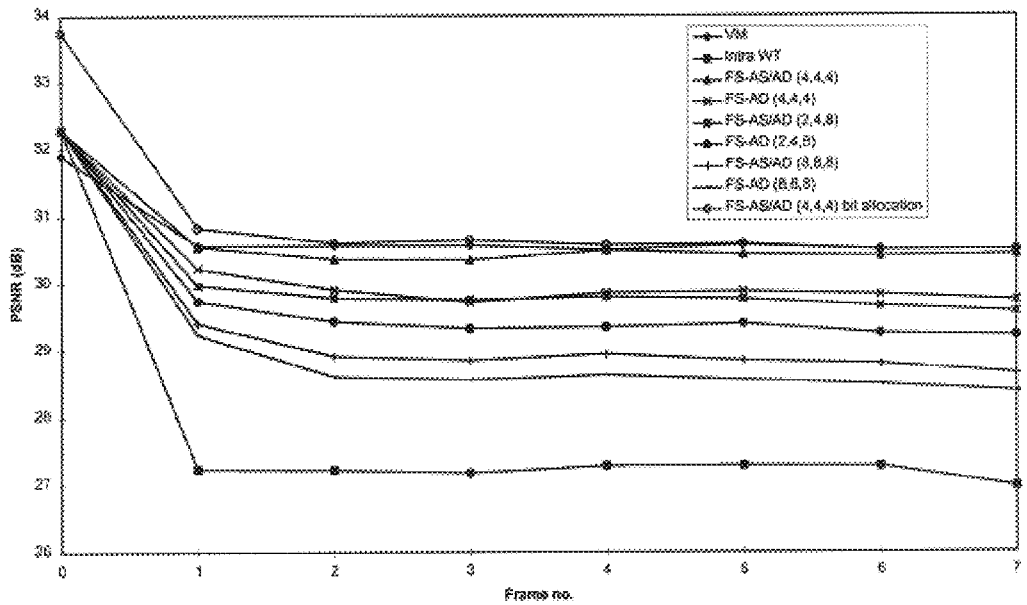
Figure 6. Coding results of the wavelet video encoder, using *FS-AS/AD* or *FS-AD*, and the MPEG-4 Verification Model (VM) for the "Mobile & Calendar" sequence. Intra wavelet coding of all frames is also indicated.
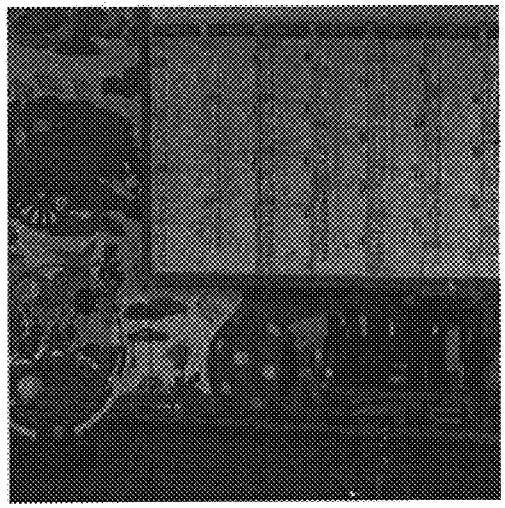
Figure 7. Reconstructed last frame of "Mobile & Calendar" sequence. (30.5 dB, 0.297 bpp)

Figure 8. "Miss America" sequence, converted to 256×256 format.

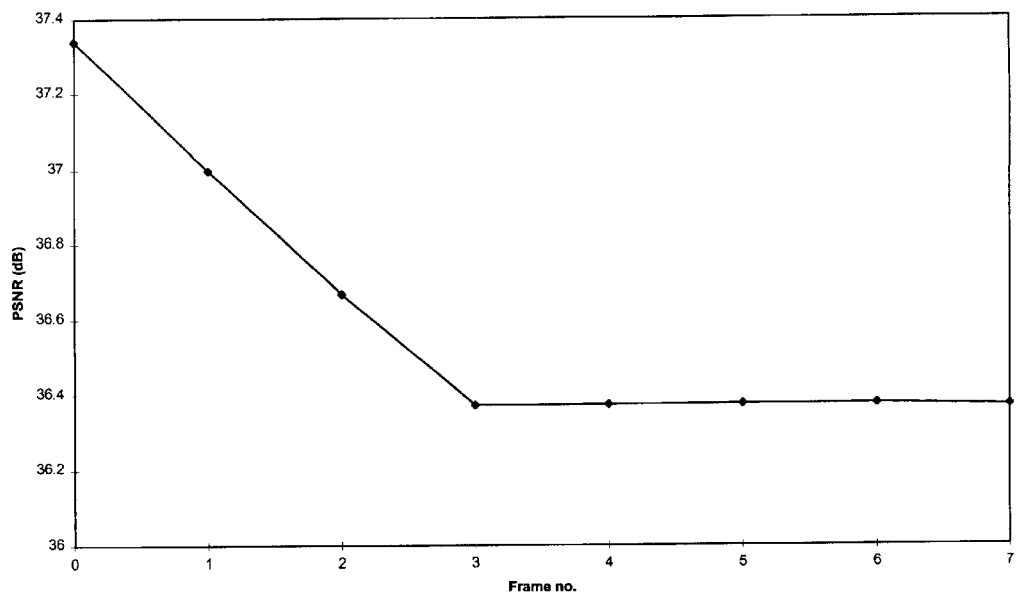
(a)
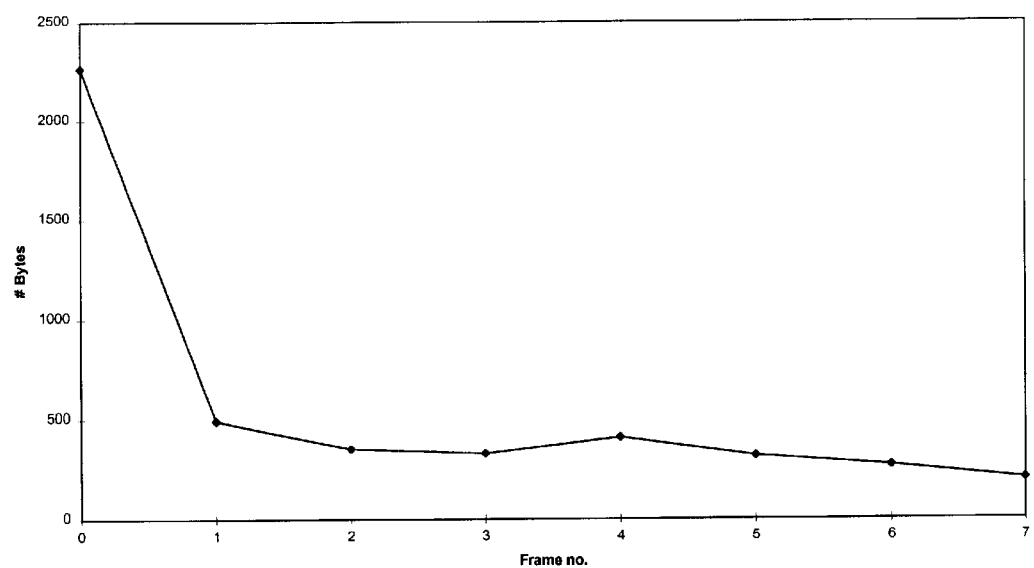
(b)
Figure 9. Coding results of the wavelet video encoder using *FS-AS/AD (4,4,4)* for the "Miss America" sequence. (a) Obtained quality and (b) number of bytes per frame. The obtained average quality is 36.6 dB at a compression ratio of 113.

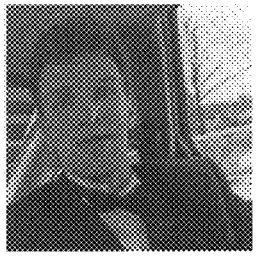
Figure 10A. "Carphone" sequence, converted to 128×128 format.
(a) 64kbit/s, 33.52dB  (b) 48kbit/s, 32dB  (c) 32kbit/s, 30.34dB
(d) 24kbit/s, 28.59dB  (e) 16kbit/s, 27.27dB  (f) 8kbit/s, 25.23dB
Figure 10B. "Carphone" sequence (128×128, 15fps) coded at the respective bitrates and resulting in the indicated average qualities.

Figure 12: k-level wavelet transformed image (k=3)

METHOD AND SYSTEM FOR VIDEO COMPRESSION

RELATED APPLICATIONS

This application claims priority to U.S. Provisional Application No. 60/126,059, filed on Mar. 25, 1999.

BACKGROUND OF THE INVENTION

1. Field of the Invention

The invention relates to video compression techniques.

2. Description of the Related Art

A video information stream comprises of a sequence of video frames. Each of the video frames can be considered as a still image. The video frames are represented in a digital system as an array of pixels. The pixels comprise of luminance or light intensity and chrominance or color information. The light and color information is stored in a memory of the digital system. For each of the pixels some bits are reserved. From a programming point of view each video frame can be considered as a two-dimensional data type. Note that fields from an interlaced video sequence can also be considered as video frames.

In principle when the video information stream must be transmitted between two digital systems, this can be realized by sending the video frames sequentially in time, for instance by sending pixels and thus bits sequentially in time.

There exist however more elaborated transmission schemes enabling faster and more reliable communication between two the digital systems. The transmission schemes are based on encoding the video information stream in the transmitting digital system and decoding the encoded video information stream in the receiving digital system. Note that the same principles can be exploited for storage purposes.

During encoding, the original video information stream is transformed into another digital representation. The digital representation is then transmitted. The goal of decoding is to reconstruct the original video information stream from the digital representation completely when lossless compression is used or approximately when lossy compression is used.

The encoding is based on the fact that temporal nearby video frames are often quite similar up to some motion. The arrays of pixels of temporal nearby video frames often contain the same luminance and chrominance information except that the coordinate places or pixel positions of the information in the arrays are shifted or displaced. Shifting or displacement in position as function of time defines a motion. The motion is characterized by a motion vector. Note that although the described similarity up to some motion of video frames appears only in ideal cases, it forms the basis of encoding based on a translational motion model. The transformation between a video frame and a temporal nearby video frame can also be a more complicated transformation. Such a complicated transformation can form the basis of a more complicated encoding method.

Encoding of the video information stream is done by performing encoding of the video frames of the sequence with respect to other video frames of the sequence. The other video frames are denoted reference video frames.

The encoding is in principle based on motion estimation of the motion between a video frame under consideration and a reference video frame. The motion estimation defines a motion vector. Motion estimation is based on calculating an error norm which is determined by a norm of the difference between two video frames. Often the sum of absolute differences of pixel values of pixels of the reference frame and the video frame under consideration is used as error norm. Other error norms can also be used. In the prior art essentially all error norms are based on differences between pixel values of pixels of both frames.

After the motion is estimated, motion compensation is performed. The motion compensation comprises of constructing a new motion compensated video frame from the reference video frame by applying the motion, defined by the motion vector. The motion compensated video frame comprises of the pixels of the reference video frame but located at different coordinate places. The motion compensated video frame can then be subtracted from the video frame under consideration. This results in an error video frame. Due to the temporal relation between the video frames, the error video frame will contain less information. This error video frame and the motion vectors are then transmitted, possibly after some additional coding. The motion estimation, motion compensation, subtraction and additional coding is further denoted by interframe encoding.

The interframe encoding can be limited to a part of a video frame. The interframe encoding is also not performed on the video frame as a whole but on pieces of the video frame. The video frame is divided into non-overlapping or even overlapping blocks. The blocks define a region in the video frame. The blocks can be of arbitrary shape. The blocks can be rectangular, triangular, hexagonal or any other shape, regular and irregular.

The blocks are thus also arrays of pixels but of smaller size than the video frame array. The interframe encoding operations are then performed on essentially all the blocks of the video frame. As the encoding of a video frame is performed with respect to a reference video frame, implicitly a relation is defined between the blocks of the video frames under consideration and the blocks of the reference video frame. Indeed the calculation of the sum of absolute differences or any other error norm will only be performed for a block of a video frame under consideration and blocks of the reference video frame which are nearby located. These locations are defined by the maximum length of the motion vector. These locations define a search area. These locations are defined by the minimum and maximum component values of the motion vector. In case of a pure translational motion model the minimum and maximum component values correspond to the search ranges. The resulting locations define the search area in the reference video frame.

Wavelets have proven to be successful in compressing still images. Compared to the classical DCT approach (JPEG), the wavelet-based compression schemes offer the advantage of a much better image quality obtained at very high compression ratios. Still image compression via the wavelet transform leads to graceful image degradation at increased compression ratios, and does not suffer from the annoying blocking artefacts, which are typical for JPEG at very low bit rates. Another advantage of wavelets over DCT is the inherent multiresolution nature of the transformation, so that progressive transmission based on scalability in quality and/or resolution of images comes in a natural way. These advantages can be efficiently exploited for sequences of video frames, especially in very low bit rate applications that can benefit from the improved image quality. Moreover, the progressive transmission capability is important to support variable channel bandwidths.

A straightforward approach to build a wavelet-based video codec, is to replace the DCT in a classical video coder by the discrete wavelet transform [Dufaux F., Moccagatta I. and Kunt M. "Motion-Compensated Generic Coding of Video Based on a Multiresolution Data Structure". Optical Engineering, 32(7):1559–1570, 1993.][Martucci S., Sodagar I. and Zhang Y.-Q. "A Zerotree Wavelet Video Coder". IEEE Trans. on Circ. and Syst. for Video Techn., 7(1):109–118, 1997.]. A drawback of this implementation is that for interframe encoding the wavelet transform is applied to the complete error video frame, which contains blocking artefacts. These artificial discontinuities, introduced in the motion vector field, lead to undesirable high-frequency subband coefficients that reduce the compression efficiency.

To avoid this limitation, the discrete wavelet transform is taken out of the temporal prediction loop which results in the video encoder depicted in FIG. 1 [Zhang Y.-Q. and Zafar S. "Motion-Compensated Wavelet Transform Coding for Color Video Compression". IEEE Trans. on Circ. and Syst. Video Techn., 2(3):285–296, 1992.]. Before the motion (ME) estimation and motion compensation (MC), the discrete wavelet transform (DWT) is calculated on the video frames, obtaining for each of the video frames an average subimage and detail subimages (FIG. 12).

Both the motion estimation and compensation are performed in the wavelet transform domain, i.e. in the average subimage of the highest level and in the detail subimages. This is feasible since the wavelet subimages contain not only frequency information but also spatial information, which is not the case for the DCT. The advantages of such a codec are: (1) the blocking artefacts due to the motion vector (MV) field are no longer transformed to the wavelet transform domain and (2) no inverse discrete wavelet transform (IDWT) is needed, so that from an implementation point of view, both hard- and software, the encoder can be simplified.

However, difficulties are encountered with this approach, because in general the discrete wavelet transform is not shift invariant [Cafforio C., Guaragnella C. and Picco R. "Motion Compensation and Multiresolution Coding". Signal Proc.: Image Communication, 6:123–142, 1994.], due to the sub-sampled nature of the transform. This implies that shifts in the spatial domain do not just produce shifts in the wavelet transform domain subimages, but change the pixel values of the coefficients in the subimages as well. Motion estimation and compensation are not as simple as in the spatial domain, where blocks are taken out of the reference video frame and are used to predict the considered video frame. In the wavelet transformed video frames the required blocks are not directly available, therefore one cannot use the same techniques as in the spatial domain. However, there is an exception if the shifts in the spatial domain are multiples of the sampling period. A dyadic wavelet transform is completely shift invariant if the spatial domain shift has the form $d \cdot 2^J$, $d \in Z$, where J denotes the number of decomposition levels (see FIG. 12). In this case, the same motion estimation and compensation approaches can be used in the wavelet transform domain and the spatial domain.

Some methods have already been introduced in [Mandal M. K., Chan E. and Panchanathan S. "Multiresolution Motion Estimation Techniques for Video Compression" (preprint)], [Zhang Y.- Q. and Zafar S. "Motion-Compensated Wavelet Transform Coding for Color Video Compression". IEEE Trans. on Circ. and Syst. Video Techn., 2(3):285–296, 1992]. They perform a hierarchical motion estimation in the wavelet detail subimages by using the mean absolute difference error (MAE), or the mean square difference error (MSE) as an error norm of the difference between two video frames or video frame blocks. To obtain the wavelet error video frame, the new motion compensated wavelet video frame is subtracted from the considered wavelet video frame (see FIG. 1), just as one would do in the spatial domain. However, since spatial shifts produce ambiguous effects in the wavelet domain, one must conclude that new methods are required for motion estimation and compensation in the wavelet transform domain.

As a conclusion it can be stated that the motion estimation and compensation methods are based on subtracting the motion compensated video frame from the reference video frame for creating the error video frame and that the motion vector estimation is based on differences between pixel values.

SUMMARY OF THE INVENTION

A method and system for video compression, compatible with and exploiting the characteristics of a state-of-the-art image transformation in the compression, is presented. In the method and the system a plurality of error norms are exploited, the error norms being intrinsically related to the characteristics of the state-of-the-art image transformation.

The invention is illustrated for video compression techniques based on a translational motion model, thus exploiting motion estimation and compensation, but is not limited hereto.

The invention is further illustrated with the wavelet transformation as image transformation but is not limited hereto.

In the first aspect of the invention, the determination of the motion vector of a block of a video frame under consideration with respect to a reference video frame is determined by exploiting a plurality of sets of error norms. The determination of the error norms within one set is done by calculating the norm of an error which is given by a function, characteristic for the set, of the pixel values of the block of the video frame and pixel values of the reference video frame but for different positions of the block with respect to the reference video frame. Each set corresponds to a different function.

In a first embodiment of this aspect of the invention, the norms are calculated for weighted sums of pixel values, the weighted sums are characterized by a weighting vector. The norms of different sets correspond to different weighting vectors.

In a second embodiment of this aspect of the invention, one set of error norms is based on summing pixel values and another on subtracting pixel values of the block under consideration and the reference video frame. Both sets are exploited in the determination of the motion vector.

In a third embodiment of this aspect of the invention, the motion vector of a block of a video frame with respect to a reference video frame is determined by exploiting two sets of error norms, the first is based on the sum of absolute differences of pixel values and the second on the sum of absolute sums of pixel values.

In a fourth embodiment of this aspect of the invention, the motion vector of a block of a video frame with respect to a reference video frame is determined by exploiting two sets of error norms, the first is based on the sum of squared differences of pixel values and the second on the sum of squared sums of pixel values.

In a fifth embodiment of the first aspect of the invention the video frame and the reference video frame contain wavelet transformed subimages. The prediction error of the detail subimages can be reduced if one considers both summing and subtracting the original and the predicted blocks [Van der Auwera G., Munteanu A., Lafruit G., Cornelis J. "Video Coding Based on Motion Estimation in the Wavelet Detail Images". Proceedings of the International Conference on Acoustics, Speech, and Signal Processing (ICASSP), pp. 2801–2804, Seattle, May 1998.], [Van der Auwera G., Munteanu A., Lafruit G., Cornelis J. "A New Technique for Motion Estimation and Compensation of the Wavelet Detail Images". Eusipco, Rhodos, September 1998.].

In a second aspect of the invention a system is presented for encoding a sequence of video frames, exploiting temporal redundancy, via motion estimation and compensation techniques, using a plurality of sets of error norms in the motion estimation and a plurality of operations for error block determination that are compatible with each set of error norms.

In a first embodiment of the second aspect of the invention both summing and taking differences of pixel values are exploited for determination of the motion vector. Further summing of pixel values or taking differences of pixel values are exploited in determination of the error block. The system comprises of dedicated circuitry for performing image transformation, motion estimation, motion compensation and construction of the error video frame, the motion estimation, exploiting both summing and taking differences of pixel values, the construction of the error video frame also exploiting either summing and taking differences of pixel values.

In a further embodiment the image transformation is a J-level wavelet transformation.

In a further embodiment the summing and taking differences of pixel values are performed by separate circuits.

In a further embodiment the system comprises of a frame encoding circuit (FIG. 11, (30)) for encoding the error video frame, and a frame decoding circuit (FIG. 1) for decoding the error video frame. Furthermore, extra encoding can be provided at the output of the interframe encoding loop (FIG. 11, (140)).

In a second embodiment of the second aspect of the invention the system is adapted for performing image transformation, motion estimation, motion compensation and construction of the error video frame, by using the motion estimation, exploiting both summing and taking differences of pixel values, the construction of the error video frame also exploiting either summing and taking differences of pixel values. The system can be either a general purpose processor or a dedicated circuit or a combination of both.

In a third aspect of the invention a system is presented for decoding a sequence of video frames, being encoded by exploiting temporal redundancy, via motion estimation and compensation techniques, using a plurality of sets of error norms in the motion estimation and a plurality of operations for error block determination that are compatible with each set of error norms. The system inputs or loads an error block and performs a decoding operation on the error block. The system also performs a motion compensation of a block of a reference video frame. Note that the reference video frame can be a stored image, being an image transmitted earlier, or just a previous received image. Said motion compensation is based on an inputted motion vector. The motion vector is determined by one of a plurality of sets of error norms, each of the sets being related to a substantially different function of pixel values. Based on the motion compensated block of the reference video frame and the decoded error block, a block of a video frame is determined with operations being compatible with the function of pixel values used for determining the motion vector.

As an example, when the motion vector is determined by using a sum of absolute differences, then the error block must be summed with the motion compensated block. When the motion vector is determined by using a sum of absolute sums, then the error block and the motion compensated block must be subtracked.

In an aspect of the invention it is recognized that one needs at the decoding peer information on how the motion vector has been determined, thus which functions has been used for calculating the minimal error. Therefore an identifier is introduced which is used in the decoding methods and decoding system, for selecting the appropriate operations for reconstruction of the block. In an aspect of the invention it is recognized that besides the traditional stream of information, such as an encoded error block and motion vector, further the extra information, embedded in the identifier must be transmitted.

One embodiment of the invention presents a method and system for video compression, compatible with and exploiting the characteristics of state-of-the-art image transformations.

BRIEF DESCRIPTION OF THE DRAWINGS

FIG. 1. (prior-art) Video encoder, being a cascade of a wavelet transform circuit (DWT, being a discrete wavelet transform circuit), an interframe encoding circuit and an extra encoding circuit, the second circuit comprising of an error video frame encoding circuit, an error video frame decoding circuit, a motion estimation circuit (ME) and a motion compensation circuit (MC), the motion estimation circuit, exploiting as estimation criterion the sum of absolute differences, the error video frame being constructed as the difference between the motion compensated block of the reference video frame and the block of the video frame under consideration. The video encoder can also contain some buffers (BUF). With INTER is meant interframe coding, thus exploiting the temporal redundancy. With INTRA is meant intraframe coding, thus coding of each video frame separately.

FIG. 2. AD and AS as a function of s and k=1, for the biorthogonal filters (2.4) and (5.5).

FIG. 3. AD and AS as a function of s and k=1, for the biorthogonal filters (9.7).

FIG. 4. "Mobile & Calendar" sequence, converted to 256×256 format.

FIG. 5. The FS-AS/AD (2,4,8) method attains a minimum with the AS criterion (white blocks) or AD criterion (black blocks).

FIG. 6. Coding results of the wavelet video encoder, using FS-AS/AD or FS-AD, and the MPEG-4 Verification Model (VM) for the "Mobile & Calendar" sequence. Intra wavelet coding of all frames individually is also indicated.

FIG. 7. Reconstructed last frame of "Mobile & Calendar" sequence. (30.5 dB, 0.297 bpp)

FIG. 8. "Miss America" sequence, converted to 256×256 format.

FIG. 9. Coding results of the wavelet video encoder using FS-AS/AD (4,4,4) for the "Miss America" sequence. (a) Obtained quality and (b) number of bytes per frame.

FIGS. 10A&B. "Carphone" sequence (128×128, 15 fps) coded at the respective bitrates and resulting in the indicated average qualities.

DETAILED DESCRIPTION OF THE INVENTION

Figure 11:
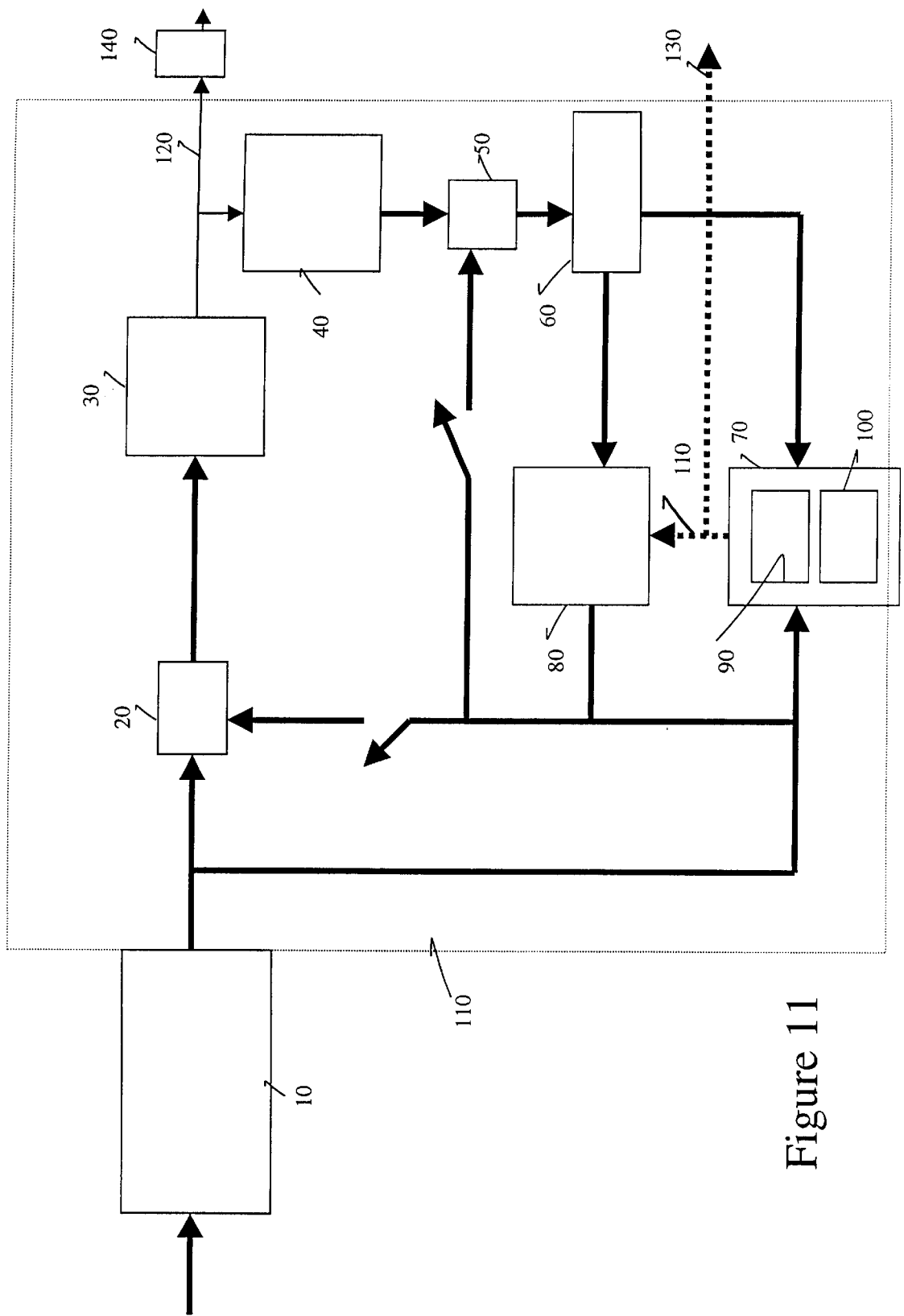
FIG. 11. Video encoder, being a cascade of a wavelet transform circuit (10) and a interframe encoding circuit (110), the latter circuit comprising of a frame encoding circuit (30), a frame decoding circuit (40), a motion estimation circuit (70) and a motion compensation circuit (80), the motion estimation circuit, exploiting two estimation error norms, one of the error norms exploiting summing of pixel values, the other exploiting difference of pixel values, the error video frame being constructed as either the difference between or the sum of the motion compensated block of the reference video frame and the block of the video frame under consideration in a circuit (20). The estimated error norms can be sums of absolute sums of pixel values and the sum of absolute differences between pixel values. The motion estimation circuit can comprise of two parallel circuits (90) and (100), each of the circuits, determining one of the estimation error norms. The wavelet transform circuit can even so be any other image transformation circuit. The circuit (110) can further comprise of buffers, like (60), block summing or subtracking blocks like (50) and various connections between the circuits (20), (30), (40), (50), (60), (70), (80). The motion estimation circuit (70) produces the motion vectors (190), being consumed by the motion compensation circuit (80) and also transmitted (130) together with the encoding video frame (120). Note that after the video encoder extra encoding circuits (140) can be placed. Note that alternatively to summing in block (20) and subtracking in block (50) the motion compensation block can perform an inversion. In that case the block (20) has as functionality subtrackting while the block (50) has as functionality summing.
Figure 12:
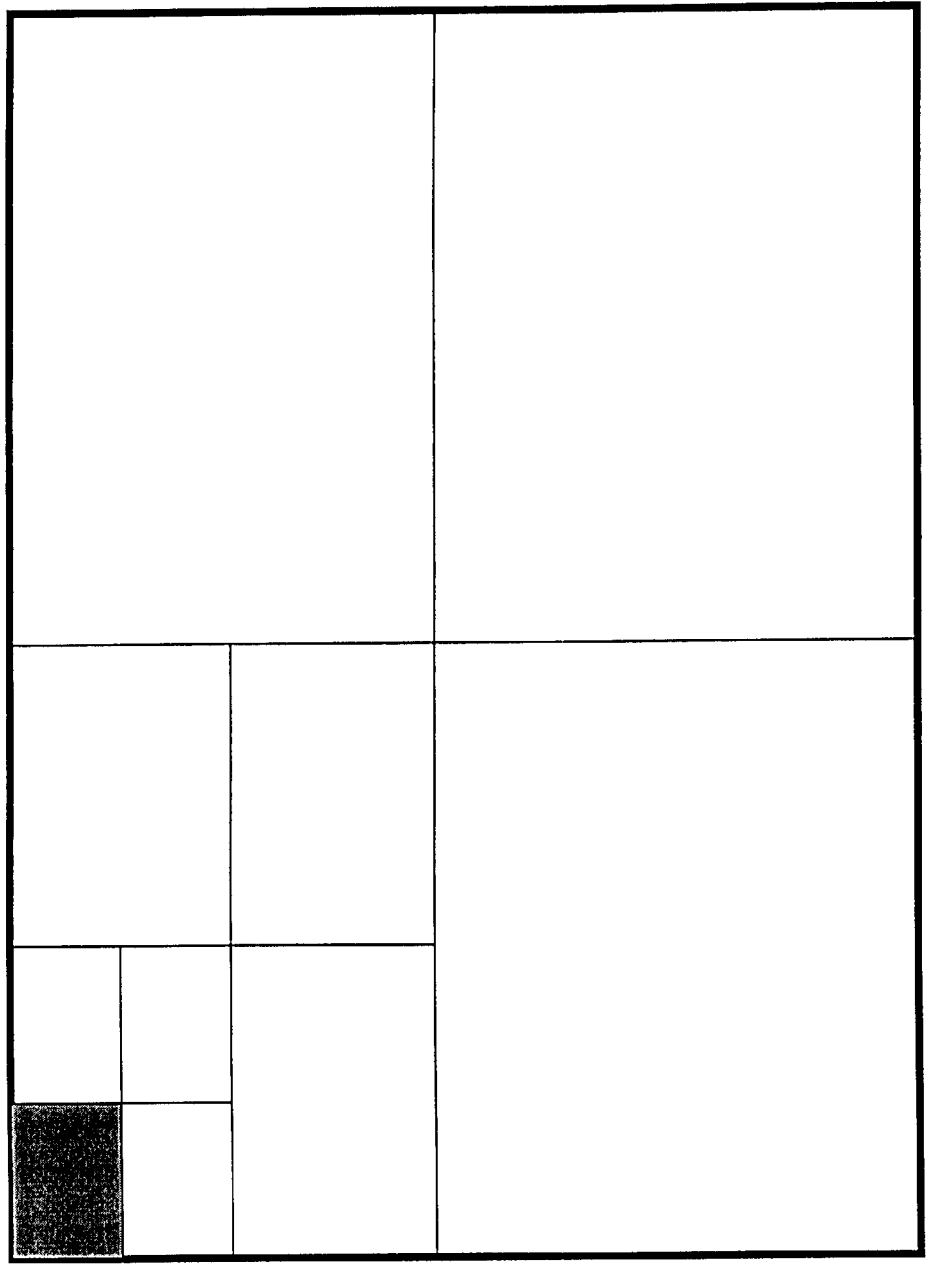
FIG. 12. A J-level wavelet transform image with J=3.
Figure 13:
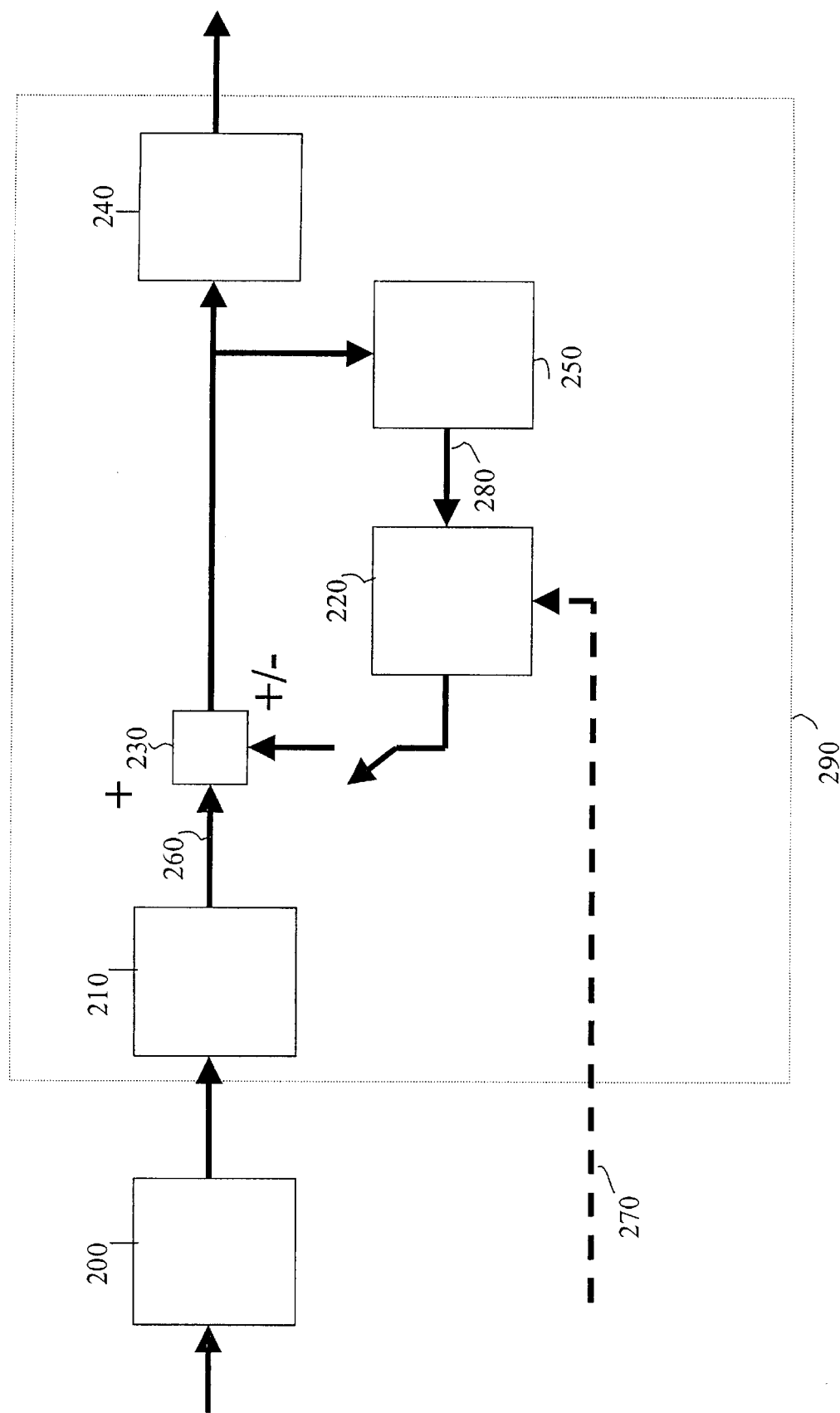
FIG. 13. Video decoder (290), comprising of a frame decoding circuit (210), a motion compensation circuit (220) and a summing/difference circuit (230). The motion compensation circuit has as input the motion vectors (270) and the reference frame (280). The summing/difference circuit exploits either summing of an error block from the error video frame (260) with the motion compensated block of the reference video frame (280), stored in storage unit or buffer (250) or subtracting the motion compensated block from the corresponding error block, depending on the motion estimation criteria, exploited in the video encoder. Note that the frame decoding circuit (210), the motion compensation circuit (220) and the summing/difference circuit (230) have essentially the same functionality as their respective counterpart (40), (80) and (50) in the encoder of FIG. 11. The video decoder (290) can be preceded with an extra decoding circuit (200), with an inverse functionality of the circuit (140) of the encoder. The video decoder can further comprise of an inverse wavelet transform circuit (240). The cascade of decoding circuit (200) and decoding circuit (210) can be a single decoding circuit. Again the alternative approach of performing inversions in the motion compensation block can be exploited here.

First an analysis in a 1-dimensional case of a wavelet transformed function and the effects of shifting in position are presented.

The detail images of wavelet transformed images contain high frequency information which corresponds mainly to edges in the spatial domain. To facilitate the calculations, the analysis is restricted to the one-dimensional case, and an arbitrary edge is modeled by a step profile.

Denote by h and g the filters used to perform a one-dimensional biorthogonal wavelet analysis of the step function x(n). The lowpass filter h is symmetric around n=0, while the highpass filter g is symmetric around n=−1. Consider that g(n) has 2N+1 coefficients, and introduce the notation $\bar{g}(n)=g(n-1)$. The highpass component obtained from a one level wavelet analysis of x(n) is given by:

$$x_g(n) = \bar{g}(0)x(2n+1) + \sum_{p=1}^{N} \bar{g}(p)[x(2n+1-p) + x(2n+1+p)].$$

Denote by $x_g(n-s)$ the signal obtained by shifting with s positions the wavelet component $x_g(n)$, and by y(n) the signal obtained by shifting with k positions the original signal x(n): y(n)=x(n−k). The highpass component of a one level wavelet analysis of y(n) is $y_g(n)$. If k is even, it is known from prior art that the one level wavelet transform is shift invariant, therefore we obtain a zero prediction error if we subtract the original samples $y_g(n)$ and the predicted samples $x_g(n-k/2)$. Conversely, if k is odd, the absolute sum between the predicted samples $x_g(n-s)$ and the original samples $y_g(n)$ is lower than the absolute difference, for specific values of s. We show this in the following for the particular case k=1 and s=1.

It is easy to prove that the general case of an odd shift k can be restricted to the particular case k=1. We will assume k=1 in the remainder of this section, which leads to the highpass component $y_g(n)$ given by:

$$y_g(n) = \bar{g}(0) \cdot x(2n) + \sum_{p=1}^{N} \bar{g}(p) \cdot [x(2n-p) + x(2n+p)].$$

We denote by AD and AS the absolute difference respectively the absolute sum between the shifted wavelet component $x_g(n-s)$ and $y_g(n)$; the expressions of AD and AS for s=1 are:

$$AD = \sum_n |x_g(n-1) - y_g(n)| = \sum_n d(n),$$

$$AS = \sum_n |x_g(n-1) + y_g(n)| = \sum_n s(n).$$

Taking into account that $\bar{g}(n)=\bar{g}(-n)$, we derive:

$$d(n) = \left| \sum_{p=1}^{N+1} (\bar{g}(p-1) - \bar{g}(p)) \cdot (x(2n-1+p) - x(2n-p)) \right|,$$

$$s(n) = \left| \sum_{p=1}^{N+1} (\bar{g}(p-1) + \bar{g}(p)) \cdot (x(2n-1+p) + x(2n-p)) \right|,$$

where $\bar{g}(N+1)=0$. Since the input signal x(n) is a step function, it can be proven that $d(n)=d(-n)=|\bar{g}(2n)|$, for every value n, verifying $0 \leq n \leq [N/2]$.

The expression for s(n) is:

$$s(n) = s(-n) = \left| \bar{g}(2n) + 2 \cdot \sum_{p=1+2n}^{N} \bar{g}(p) \right|, \forall n \in N, 0 \leq n \leq [N/2].$$

If n<−[N/2] or n>[N/2], we can show that s(n)=d(n)=0.

Finally, the absolute difference and the absolute sum are given by:

$$AD = |g(-1)| + 2\sum_{n=1}^{[N/2]}|g(2n)|,$$

$$AS = 2\sum_{n=1}^{[N/2]}\left|g(2n-1) + 2\sum_{p=2n}^{N-1}g(p)\right|.$$

TABLE 1

The values of the absolute sum and absolute difference for different biorthogonal filters T (s = 1).

| Filters | AS | AD |
| --- | --- | --- |
| Biorthogonal (2.4) | 0.0000 | 0.3535 |
| Biorthogonal (2.8) | 0.0000 | 0.3535 |
| Biorthogonal (3.9) | 0.1768 | 0.3535 |
| Biorthogonal (5.5) | 0.1772 | 0.5459 |
| Biorthogonal (6.8) | 0.1315 | 0.4342 |
| Biorthogonal (9.7) | 0.0883 | 0.4349 |

The values of AD and AS are evaluated for different biorthogonal filter banks. As we note from Table 1, the absolute sum is smaller than the absolute difference for all the considered filters. We observe also that AS is zero for the first two filters. Hence, a zero prediction error can be obtained if the filter coefficients satisfy the constraint:

$$2\sum_{n=1}^{[N/2]}\left|g(2n-1) + 2\sum_{p=2n}^{N-1}g(p)\right| = 0.$$

Similar calculations are made to derive AD and AS for s≠1(k=1). For all the tested filters, the minima of the absolute sum are reached in s=1, and they are smaller than the minima of the absolute difference. An example is given in FIG. 2, that depicts AD and AS as a function of s, for the biorthogonal filters (2.4) and (5.5). The same conclusion can be formulated from FIG. 3 in the case of the biorthogonal filter (9.7). It results that the smallest prediction error is attained if $y_g(n)$ is predicted from $x_g(n-1)$ by using the AS criterion.

Above we have shown that for odd shifts of the step function a small or even zero prediction error can be found if the predicted wavelet coefficients are summed to the original coefficients. If the shift is even, then we have to subtract them to get a zero error. Further we describe an algorithm that performs motion estimation in the wavelet detail images by using two matching criteria, namely AD and AS. We will compare the resulting prediction error of our algorithm with the minimal error that can be reached by just using AD as a matching criterion.

The FS with AD method performs Full-Search motion estimation on every level of the wavelet decomposition by using AD as error criterion, and calculates the error image by subtracting the predicted wavelet image from the original image.

In our simulations, we use a 3-levels wavelet decomposition, so the full-search motion estimation is performed in the four subimages of level 3 and in the six subimages of levels 2 and 1. To define the block sizes in the detail images we use two different approaches. In the first one we impose the same block size in any detail image, while in the second one we use dyadic block sizes containing $2^{c-j} \times 2^{c-j}$ coefficients, where j denotes the decomposition level and c is a constant. We identify this algorithm as the FS-AD method (full-search using AD) in the section reporting the experimental results.

We propose a motion estimation algorithm that performs full-search motion estimation on every level of the wavelet decomposition and implements two matching criteria for finding the best block, namely AS and AD. The block sizes on every level and the search ranges are specified as in the FS-AD method. Due to its lowpass nature, in the average image we use only AD as matching criterion.

In the FS-AD method, the motion vector is determined by the position of the block in the reference image that minimizes AD. If we also calculate AS for every search position in the reference image, then it is possible that the minimum obtained with the AS criterion is smaller than the minimum given by the AD criterion. If this is the case, then the motion vector is determined by the position of the block in the reference image where AS is minimal. Conversely, if the minimum of AD is the smallest, then the motion vector will be the same as for the FS-AD method. We deduce that this method yields a smaller prediction error than the FS-AD method. We refer to this algorithm as the FS-AS/AD method (full-search using AS and AD).

The arithmetic complexity of FS-AS/AD is compared to FS-AD [Van der Auwera G., Lafruit G., Cornelis J. "Arithmetic Complexity of Motion Estimation Algorithms". IEEE Benelux Signal Processing Symposium, pp. 203–206, Leuven, March 1998.]. The search ranges in the detail images are $2^{4-j}$ pixels, with j being the decomposition level. Table 2 contains the number of arithmetic operations for the motion estimation process using 256×256 images. It follows that the FS-AS/AD method takes twice the number of operations of the FS-AD method, because it makes use of two matching criteria in parallel. We can also compare FS-AS/AD to the equivalent full search method in the spatial domain, i.e. level 0 of the wavelet decomposition or the original image. If we use an equivalent search range of 16, then we obtain 214.1 million operations, so more than two times the amount of FS-AS/AD.

The arithmetic complexity determines the necessary hardware, but it is not the only factor to take into consideration. If one also considers energy dissipation, then the memory transfers will be the dominant factor. E.g. according to [Gordon B., Tsern E., Meng T. "Design of a Low Power Video Decompression Chip Set for Portable Applications". Journal of VLSI Signal Processing Systems, no. 13, 1996.], an external memory access consumes approximately 16000 pJ compared to 7 pJ for an addition.

Without any memory optimization, the calculation of one AS or AD criterion takes two external read operations from memory. Table 2 contains the number of memory transfers for the FS-AS/AD and the FS-AD method. It follows that the transfer amount is the same for both methods, since the AS and AD criterion can be calculated simultaneously while requiring only two memory reads. The energy cost for both methods, shown in Table 2, is approximately equal. Hence, we conclude that the extra arithmetic complexity of the FS-AS/AD method with respect to FS-AD is negligible if one considers energy dissipation, since the number of required memory transfers does not significantly increase.

TABLE 2

Arithmetic and memory transfer complexity of the FS-AS/AD and FS-AD methods. (Image size = 256 × 256).

|   | Operations ($10^6$) | Transfers ($10^6$) | Energy Cost ($10^9$pJ) |
|---|---|---|---|
| FS-AS/AD | 91.6 | 30.6 | 490.2 |
| FS-AD | 45.8 | 30.6 | 489.9 |

To assess the performance of the FS-AS/AD method, we have implemented a software simulation of the wavelet encoder architecture depicted in FIG. 11. We have chosen the biorthogonal (9,7) wavelet filters to generate a 3 levels pyramidal image structure for the motion estimation process. This choice is inspired by the fact that these filters in general provide the best coding results for photographic images. Moreover, in Table 1 we have shown that for an odd shift of the step function the prediction error obtained by the AS criterion is very low.

The coding results are obtained for eight frames of the gray-scale "Mobile & Calendar" sequence, which we have converted to the 256×256 format. This is an ISO class C sequence, meaning high spatial detail and medium amount of movement. FIG. 4 depicts the first frame.

To situate the coding performance of our wavelet video encoder, we compare it with the October '97 MPEG-4 Verification Model (VM) [ISO/IEC JTC1/SC29/WG11 N1902. "Information Technology—Coding of Audio-Visual Objects: Visual". International Organization for Standardization (ISO), Fribourg, October 1997] which we put in unadvanced motion estimation mode. In this mode the encoder performs motion estimation with half pixel accuracy and uses 16×16 blocks. Since we have not implemented B-frames in our wavelet video encoder, the frame interdependency is restricted to IPPPPPPP. Table 3 contains the coding results for each frame. Since the "Mobile & Calendar" sequence is rectangular, no shape coding is required.

TABLE 3

MPEG-4 VM coding results for the "Mobile & Calendar" sequence (256 × 256).

| Frame No. | Image Type | PSNR (dB) | bpp (texture) |
|---|---|---|---|
| 0 | I | 31.90 | 0.8597 |
| 1 | P | 30.57 | 0.2974 |
| 2 | P | 30.57 | 0.2890 |
| 3 | P | 30.57 | 0.2959 |
| 4 | P | 30.50 | 0.3028 |
| 5 | P | 30.57 | 0.2955 |
| 6 | P | 30.50 | 0.3063 |
| 7 | P | 30.50 | 0.2959 |

While coding the sequence with our wavelet video encoder, we impose an identical number of bits per pixel (bpp) for each frame as for VM. This allows us to compare the reconstructed quality, expressed by PSNR values, to the quality of VM.

We compare FS-AS/AD to FS-AD for different block sizes, denoted by e.g. (2,4,8) representing 2×2 wavelet coefficients on decomposition level 3, 4×4 on level 2 and 8×8 on level 1. We use identical search ranges for these motion estimation algorithms, i.e. [−2,2] on level 3, [−4,4] on level 2 and [−8,8] on level 1. Experiments show that for the "Mobile & Calendar" sequence AS reaches a smaller minimum than AD for more than half of the total number of blocks. This is illustrated in FIG. 5 which shows all blocks in the wavelet detail images. A block is drawn in white if the AS criterion reaches the lowest minimum or in black if the AD criterion attains the lowest minimal value.

To assess the coding gain obtained by performing motion estimation and compensation, we also coded the sequence on a frame by frame basis, i.e. complete intra frame coding of the sequence using the wavelet transform. The results are illustrated in FIG. 6.

Inter wavelet coding by using FS-AD or FS-AS/AD compared to intra wavelet coding, yields a considerable quality gain for the same number of bits per frame. The average gain attained by the worst FS-AD method, i.e. FS-AD (8,8,8), is 1.4 dB. For the FS-AD (4,4,4) method, this is the best AD method, the average gain is 2.7 dB. If we compare the quality gains of the FS-AS/AD methods to intra wavelet coding, then we calculate an average gain of almost 1.7 dB for the worst method, i.e. FS-AS/AD (8,8,8), and 3.2 dB for FS-AS/AD (4,4,4) which is the best one. Hence, we conclude that our wavelet video encoder achieves a considerable quality gain by performing motion estimation in the wavelet domain, compared to intra wavelet transform coding. Moreover, performing motion estimation in the wavelet detail images by using both the absolute sum and the absolute difference as block matching criteria in the FS-AS/AD method, results in a quality gain that varies between 0.3 and 0.5 dB compared to the FS-AD method, which only uses the absolute difference. In this way the FS-AS/AD (4,4,4) method gets close to the quality curve of the VM, but does not surpass it. This is due to the restriction that we impose the same number of bits for every frame as for VM. By using our own bit allocation we are able to exceed the VM curve. This is shown in FIG. 6 by the "FS-AS/AD (4,4,4) bit allocation" curve. We see that this curve is slightly above the VM curve for the inter wavelet coded frames. Moreover, the intra wavelet coded image is approximately 1.5 dB above the intra coded DCT image. Although we changed the bit allocation for this sequence, the total number of bits is still the same as for VM. This indicates that our wavelet video encoder needs its own bit allocation procedure to attain an optimal rate distortion result. FIG. 7 depicts the reconstruction of the last frame of this sequence.

The coding results are obtained for eight frames of the gray-scale "Miss America" sequence, which we have converted to the 256×256 format. This is an ISO class A sequence, meaning low spatial detail and low amount of movement. FIG. 8 depicts the first frame.

The coding results are obtained for the gray-scale "Carphone" sequence, which we have converted to the 128×128 format. FIG. 10A depicts the first frame. We have coded this sequence at different bit rates while maintaining 15 fps. FIG. 10B shows for each bitrate one frame from the reconstructed sequences together with the average quality.

What is claimed is:

1. A method of determining the motion vector of a block of a video frame with respect to a reference video frame, the video frame and reference video frame comprising pixels, wherein each pixel has a pixel value, the method comprising:

determining a plurality of sets of error norms, wherein each error norm within one of the sets is related to a different position of the block in the reference video frame, wherein the error norms are calculated by a norm of an error which is given by functions of the pixel values of the block of the video frame and the reference video frame, and wherein each set of the plurality of sets is related to a different function; and selecting the motion vector with the smallest error norm.

2. The method of claim 1, wherein the norms are calculated for weighted sums of the pixel values of the block of the video frame and the reference video frame, wherein the weighted sums are characterized by a weighting vector, and wherein each set of the plurality of sets are related to a different weighting vector.

3. The method of claim 1, wherein the error norms of the first set are the sum of absolute differences between pixel values of the block of the video frame and the reference video frame, and wherein the error norms of the second set are the sum of absolute sums of pixel values of the block of the video frame and the reference video frame.

4. The method of claim 1, wherein the error norms of the first set are the sum of squared differences between pixel values of the block of the video frame and the reference video frame; and wherein the error norms of the second set are the sum of squared sums of pixel values of the block of the video frame and the reference video frame.

5. The methods of claim 1, wherein the video frame and the reference video frame contain J-level wavelet transformed images.

6. A system for encoding a sequence of video frames, the video frames comprising pixels, wherein each pixel has a pixel value, and wherein the video frames are divided in blocks, the system comprising:
    a first circuit for transforming of the video frames from a first representation to a second representation;
    a second circuit for performing motion estimation for blocks of the video frames with respect to a reference video frame, wherein the motion estimation exploits a plurality of sets of error norms, wherein the error norms are a norm of an error which is determined by functions of the pixel values of the block of the video frame and the reference video frame, and wherein each set of the plurality of sets is related to a different function;
    a third circuit for performing motion compensation of blocks of the video frames with respect to the reference video frame; and
    a fourth circuit, for determining an error block from two of the blocks, exploiting operations on the blocks, wherein each of the operations is compatible with one of the functions.

7. The system of claim 6, wherein:
    the plurality of sets of error norms comprise a first set of error norms and a second set of error norms;
    the error norms of the first set exploits summing of pixel values of pixels of video frames;
    the error norms of the second set exploits taking differences of pixel values of pixels of video frames; and
    the operations on the blocks being either summing of pixel values or taking differences of pixel values of the blocks.

8. The system of claim 6, wherein the first circuit is adapted for performing a J-level wavelet transformation.

9. The system of claim 7, wherein the second circuit comprises:
    a fifth circuit for determining the first error norms; and
    a sixth circuit for determining the second error norms.

10. The system of claim 7, wherein the system further comprises:
    a seventh circuit for frame encoding the error block and an eighth circuit for frame decoding the error block.

11. A system for encoding a sequence of video frames, the video frames comprising pixels, wherein each pixel has a pixel value, the video frames being divided in blocks, the system is adapted for:
    transforming the images on each of the video frames from a first representation to a second representation;
    performing motion estimation for blocks of the video frames, the motion estimation for blocks of the video frames with respect to a reference video frame exploiting a plurality of sets of error norms, the error norms being calculated by norms of an error which is given by functions of the pixel values of the block of the video frame and the reference video frame, each set of the plurality of sets being related to a different function;
    performing motion compensation of blocks of the video frames with respect to the reference video frame; and
    determining an error block from two of the blocks.

12. The system of claim 11, wherein the system determines at least part of the error norms in parallel.

13. A system for decoding a sequence of video frames, the video frames comprising pixels, wherein each pixel has a pixel value, and wherein the video frames being divided into blocks, the system comprising:
    a first circuit for inputting and decoding an error block;
    a second circuit for performing motion compensation of a block of a reference video frame, based on an inputted motion vector, the motion vector being determined by one of a plurality of sets of error norms, each of the sets being related to a substantially different function of pixel values; and
    a third circuit for determining a block of a video frame from the motion compensated block of the reference video frame and the error block and with operations being compatible with the function of pixel values used for determining the motion vector.

14. The system of claim 13, wherein:
    the plurality of sets of error norms comprising a first set of error norms and a second set of error norms;
    the error norms of the first set exploiting summing of pixel values of pixels of video frames;
    the error norms of the second set exploiting taking differences of pixel values of pixels of video frames; and
    the operations for determining the block of a video frame from the motion compensated block of the reference video frame and the error block being either summing of pixel values or taking differences of pixel values of the error block and the motion compensated block of the reference video frame.

15. The system of claim 13 or 14, wherein at least the error block, the decoded error block are J-level wavelet transformed images.

16. The system of claim 13, further comprising an inverse wavelet transform circuit.

17. A system for decoding a sequence of video frames, the video frames comprising pixels, wherein each pixel has a pixel value, and wherein the video frames are divided into blocks, the system is adapted for:
    inputting and decoding an error block;
    performing motion compensation of a block of a reference video frame, based on an inputted motion vector, the motion vector being determined by one of a plurality of sets of error norms, each of the sets being related to a substantially different function of pixel values; and
    determining a block of a video frame from the motion compensated block of the reference video frame and the error block with operations being compatible with the function of pixel values used for determining the motion vector.

18. A method of determining a block of a video frame from an error block, a reference video frame and a motion vector, the method comprising:
    inputting the error block, the motion vector, and an identifier attached to the motion vector;

performing a motion compensation of a block of the reference video frame with respect to the reference video frame, based on the inputted motion vector; and determining the block of the video frame from the error block and the motion compensated block of the reference video frame, thereby selecting operations on pixel values of the motion compensated block of the reference video frame and the error block based on the identifier, wherein the motion vector is determined by one of a plurality of sets of error norms, wherein each of the sets is related to a substantially different function of pixel values, wherein the identifier identifies which function is exploited for motion vector estimation, and wherein the operations on pixel values of the motion compensated block of the reference video frame and the error block are compatible with the identified function.

19. The method of claim 18, wherein the identifier comprises at least two values, wherein a first of the two values is related to a motion vector determination by using the sum of absolute differences of pixel values, wherein a second of the two values are related to a motion vector determination by using the sum of absolute sums of pixel values, wherein the operations sum pixel values while the identifier is equal to the first value, and wherein the operations subtract pixel values while the identifier is equal to the second value.

20. The method of claim 9 or 19, wherein the motion compensation and the determining of the block is performed on wavelet transformed images.

21. The method of transmitting a block of a video frame from a first peer to a second peer, comprising:

determining a motion vector for the block with respect to a reference video frame by using one of a plurality of sets of error norms, each of the sets being related to a substantially different function of pixel values;

assigning a value to an identifier, based on the function being exploited for determining the motion vector;

compensating the motion of the block with respect to the reference video frame by using the motion vector;

determining an error block based on the motion compensated block and the reference video frame;

transmitting the motion vector, the identifier and the error block from the first peer to the second peer;

inputting the motion vector, the identifier and the error block;

compensating the motion of the motion compensated block with respect to the reference video frame by exploiting the inputted motion vector; and determining the block of the video frame by performing operations on pixel values of the motion compensated block from the reference video frame and the error block and, thereby selecting operations based on the identifier.

22. The method of claim 21, wherein the identifier comprises at least two values, wherein a first of the two values is related to a motion vector determination by using the sum of absolute differences of pixel values, wherein a second value of the two values is related to a motion vector determination by using the sum of absolute sums of pixel values, wherein the operations sum pixel values while the identifier is equal to the first value, and wherein the operations subtract pixel values while the identifier is equal to the second value.

23. The method of claim 21, wherein the motion compensation and the determining of the block is performed on wavelet transformed images.

24. A system for encoding a sequence of video frames, the video frames comprising pixels, wherein each pixel has a pixel value, and wherein the video frames are divided in blocks, the system comprising:

a first circuit for transforming of the video frames from a first representation to a second representation;

a second circuit for performing motion estimation for blocks of the video frames with respect to a reference video frame, wherein the motion estimation exploits a plurality of sets of error norms, wherein the error norms are a norm of an error which is determined by functions of the pixel values of the block of the video frame and the reference video frame, and wherein each set of the plurality of sets are related to a different function;

a third circuit for performing motion compensation of blocks of the video frames with respect to the reference video frame; and a fourth circuit, for determining an error block from two of the blocks, wherein the determining is based upon the output of one of the functions.

25. A method of determining the motion vector of a block of a video frame with respect to a reference video frame, the video frame and reference video frame comprising pixels, wherein each pixel has a pixel value, the method comprising:

determining a plurality of sets of error norms, wherein each error norm within one of the sets is related to a different position of the block in the reference video frame, wherein the error norms are calculated by a norm of an error which is given by functions of the pixel values of the block of the video frame and the reference video frame, and wherein each set of the plurality of sets is related to a different function; and selecting the motion vector having the smallest error norm, wherein the plurality of sets of error norms comprises a first set of error norms and a second set of error norms, wherein the error norms of the first set are based upon differences between pixel values of the block of the video frame and the reference video frame, and wherein the error norms of the second set are based at least in part upon summing pixel values of the block of the video frame and the reference video frame.

26. The method of claim 25, wherein the error norms are calculated for weighted sums of the pixel values of the block of the video frame and the reference video frame, wherein the weighted sums are characterized by a weighting vector, and wherein each set of the plurality of sets are related to a different weighting vector.

27. The method of claim 25, wherein the error norms of the first set are the sum of absolute differences between pixel values of the block of the video frame and the reference video frame, and wherein the error norms of the second set are the sum of absolute sums of pixel values of the block of the video frame and the reference video frame.

28. The method of claim 25, wherein the error norms of the first set are the sum of squared differences between pixel values of the block of the video frame and the reference video frame; and wherein the error norms of the second set are the sum of squared sums of pixel values of the block of the video frame and the reference video frame.

29. The method of claim 25, wherein the video frame and the reference video frame comprise J-level wavelet transformed images.

* * * * *